US012718127B2

(12) United States Patent
Kulkarni et al.

(10) Patent No.: US 12,718,127 B2
(45) Date of Patent: Aug. 25, 2026

(54) METHOD AND SYSTEM FOR RECOMMENDING OPTIMUM COMBINATION OF QUANTUM CIRCUITS

(71) Applicant: Tata Consultancy Services Limited, Mumbai (IN)

(72) Inventors: Aniket Nandkishor Kulkarni, Pune (IN); Sukesh Kumar Ranjan, Pune (IN); Pathai Viswanathan Venkateswaran, Bangalore (IN); Mariswamy Girish Chandra, Bangalore (IN); Pranav Champaklal Shah, Thane West (IN); Sayantan Pramanik, Bangalore (IN); Chundi Venkata Sridhar, Hyderabad (IN); Vishnu Vaidya, Bangalore (IN); Vidyut Vaman Navelkar, Mumbai (IN); Sudhakara Deva Poojary, Thane West (IN); Mayank Baranwal, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 572 days.

(21) Appl. No.: 18/218,744

(22) Filed: Jul. 6, 2023

(65) Prior Publication Data

US 2024/0013081 A1 Jan. 11, 2024

(30) Foreign Application Priority Data

Jul. 11, 2022 (IN) ............................ 202221039639

(51) Int. Cl.
*G06Q 30/00* (2023.01)
*G06N 10/20* (2022.01)

(52) U.S. Cl.
CPC .................................. *G06N 10/20* (2022.01)

(58) Field of Classification Search
None
See application file for complete search history.

(56) References Cited

U.S. PATENT DOCUMENTS

| | | | | |
|---|---|---|---|---|
| 2022/0230087 | A1* | 7/2022 | Castrillo | G06N 10/70 |
| 2024/0289355 | A1* | 8/2024 | Lin | G06N 3/044 |
| 2024/0386015 | A1* | 11/2024 | Crabtree | G06F 16/245 |

OTHER PUBLICATIONS

Hua Tian et al. : "Machine learning of percolation models using graph convolutional neural networks", arxiv.org, Cornell University Library (Year: 2022).*

(Continued)

*Primary Examiner* — Matthew T Sittner
(74) *Attorney, Agent, or Firm* — FINNEGAN, HENDERSON, FARABOW, GARRETT & DUNNER LLP

(57) ABSTRACT

Traditional approaches for recommending optimum combination of quantum circuits are experimentation based approaches, and require manual efforts or are cumbersome, effort intensive and iterative processes. Method and system disclosed herein generally relates to quantum experimentation, and, more particularly, for recommending optimum combination of quantum circuits. In this approach, a high-level combination of experiments are initially generated, which are further prioritized using a graph based approach, which then forms a training data. The training data is then used for generating a GNN data model, which is further used for recommending optimum combination of quantum circuits.

7 Claims, 5 Drawing Sheets

(56) References Cited

OTHER PUBLICATIONS

Hua Tian et al. : "Machine learning of percolation models using graph convolutional neural networks", arxiv.org, Cornell University Library 2022 (Year: 2022).*
Ying Rex et al. : "Hierarchical graph representation learning with differentiable pooling", arXiv.org, Feb. 20, 2019 (Year: 2019).*
I. Kyosev, I. Paun, Y. Moshfeghi and N. Ntarmos, "Measuring Distances Among Graphs En Route To Graph Clustering," 2020 IEEE International Conference on Big Data (Big Data), Atlanta, GA, USA, 2020 (Year: 2020).*
M. Khosla, V. Setty and A. Anand, "A Comparative Study for Unsupervised Network Representation Learning," in IEEE Transactions on Knowledge and Data Engineering, vol. 33, No. 5, pp. 1807-1818, May 1, 2021 (Year: 2021).*
Bagherzadeh et al., "Reinforcement Learning for Test Case Prioritization," (2021).
Gokhale et al., "Quantum Fan-out: Circuit Optimizations and Technology Modeling," (2021).
Krenn et al., "Automated Search for new Quantum Experiments," (2016).
Moussa et al., "Unsupervised strategies for identifying optimal parameters in Quantum Approximate Optimization Algorithm," EPJ Quantum Technology (2022).
Nam et al., "Automated optimization of large quantum circuits with continuous parameters," npj Quantum Information (2018).
Sim et al., "Expressibility and entangling capability of parameterized quantum circuits for hybrid quantum-classical algorithms," (2019).
Zhao et al., "An Experimental Investigation into the Rank Function of the Heterogeneous Earliest Finish Time Scheduling Algorithm," (2003).

* cited by examiner

METHOD AND SYSTEM FOR RECOMMENDING OPTIMUM COMBINATION OF QUANTUM CIRCUITS

PRIORITY CLAIM

This U.S. patent application claims priority under 35 U.S.C. § 119 to: Indian Patent Application No. 202221039639, filed on Jul. 11, 2022. The entire contents of the aforementioned application are incorporated herein by reference.

TECHNICAL FIELD

The disclosure herein generally relates to quantum experimentation, and, more particularly, to a method and system for recommending optimum combination of quantum circuits.

BACKGROUND

Artificial Intelligence (AI) models have different architectures and hyperparameters which needs to be customized for a specific task or dataset. In classical Machine Learning (ML) application, various Automated Machine Learning (AutoML) frameworks and libraries are available to help automate the process of model identification and hyperparameter tuning. In quantum domains, a quantum circuit is a model for quantum computation, similar to classical circuits, in which a computation is a sequence of quantum gates, measurements, initializations of qubits to known values, and possibly other actions. To obtain intended results in quantum applications, it is important that appropriate circuitries and other components are selected and used.

Typically, experimentation based approaches are used for shortlisting the appropriate components. However, the state of the art approaches being used for quantum experimentation have the following challenges; a) manual efforts are involved to perform large number of experiments, b) the approaches are cumbersome, effort intensive and iterative processes, c) they do not provide means for identifying all combinations for experimentation, d) for executed all or subset of experiments, tracking results and comparing them is difficult, and e) manual interventions are required, which makes the process time consuming and prone to errors.

SUMMARY

Embodiments of the present disclosure present technological improvements as solutions to one or more of the above-mentioned technical problems recognized by the inventors in conventional systems. For example, in one embodiment, A processor implemented method is provided. The method includes receiving, via one or more hardware processors, an input data comprising a) definition of each of a plurality of tasks for experimentation, b) information on orchestration of each of the plurality of tasks as workflow defining execution order and concurrency of execution, and c) a search space for triggering the plurality of tasks. Further a training data is generated using the input data, via the one or more hardware processors. Generating the training data includes the following steps. A plurality of initial high-level combinations of the plurality of tasks are generated based on a plurality of hyper parameters with default parameters from the search space. Further, the plurality of high-level combinations are prioritized, Prioritizing the plurality of high-level combinations includes the following steps, Initially, a dissimilarity score between each two distinct experiments among a plurality of experiments associated with the plurality of tasks is computed. Further, a graph is generated, wherein in the graph, the plurality of experiments form vertices of the graph and an exponentiation of negative pairwise dissimilarity score form edge-weights of the vertices. Further, the vertices of the graph are soft-clustered into a plurality of clusters to determine probability of each node of the graph belonging to a cluster. Further, a plurality of subgraphs are generated for each cluster, wherein in the subgraph s the plurality of experiments form vertices of the graph and pairwise dissimilarity score form edge-weights of the vertices. Further, the following steps are iteratively performed till one of a) all the vertices have been evaluated, b) a maximum number of trials has been exhausted, and c) a defined time-limit has been reached is satisfied: selecting a cluster based on an associated probability score, wherein the probability score depends on a cluster-reward; computing a sum of edge weights with respect to a neighbor edge of each vertex within the selected cluster; computing a probability score for each vertex using softmax on the computed sum of edge weights, wherein the probability score determines probability of selecting the vertex for execution, wherein the plurality of high-level combinations are prioritized based on value of the associated probability score; selecting a vertex from the selected cluster, based on the computed probability score; and executing the selected vertex based on the probability score to obtain a performance metric, wherein the input data and the associated performance metric forms the training data. Further, a GNN data model is trained using the training data.

In an embodiment of the method, the information on orchestration of each of the plurality of tasks is received as workflow defining execution order and concurrency of execution.

In another embodiment of the method, the dissimilarity score between the two distinct experiments is computed using fidelity, hilbert space, and estimated probability distribution of fidelities.

In another embodiment of the method, the edge weights and the cluster-reward are readjusted with respect to the performance metric.

In yet another embodiment, a system is provided. The system includes one or more hardware processors, a communication interface, and a memory storing a plurality of instructions. The plurality of instructions when executed, cause the one or more hardware processors to receive an input data comprising a) definition of each of a plurality of tasks for experimentation, b) information on orchestration of each of the plurality of tasks as workflow defining execution order and concurrency of execution, and c) a search space for triggering the plurality of tasks. Further a training data is generated using the input data, via the one or more hardware processors. Generating the training data includes the following steps. A plurality of initial high-level combinations of the plurality of tasks are generated based on a plurality of hyper parameters with default parameters from the search space. Further, the plurality of high-level combinations are prioritized. Prioritizing the plurality of high-level combinations includes the following steps. Initially, a dissimilarity score between each two distinct experiments among a plurality of experiments associated with the plurality of tasks is computed. Further, a graph is generated, wherein in the graph, the plurality of experiments form vertices of the graph and an exponentiation of negative pairwise dissimilarity score form edge-weights of the vertices. Further, the vertices of the graph are soft-clustered into a plurality of clusters to determine probability of each node of the graph belonging to a cluster. Further, a plurality of subgraphs are generated for each cluster, wherein in the subgraph, the plurality of experiments form vertices of the graph and pairwise dissimilarity score form edge-weights of the vertices. Further, the following steps are iteratively performed till one of a) all the vertices have been evaluated, b) a maximum number of trials has been exhausted, and c) a defined time-limit has been reached is satisfied: selecting a cluster based on an associated probability score, wherein the probability score depends on a cluster-reward; computing a sum of edge weights with respect to a neighbor edge of each vertex within the selected cluster; computing a probability score for each vertex using softmax on the computed sum of edge weights, wherein the probability score determines probability of selecting the vertex for execution, wherein the plurality of high-level combinations are prioritized based on value of the associated probability score; selecting a vertex from the selected cluster, based on the computed probability score; and executing the selected vertex based on the probability score to obtain a performance metric, wherein the input data and the associated performance metric forms the training data. Further, a GNN data model is trained using the training data.

In yet another embodiment of the system, the information on orchestration of each of the plurality of tasks is received as workflow defining execution order and concurrency of execution.

In yet another embodiment of the system, the dissimilarity score between the two distinct experiments is computed using fidelity, hilbert space, and estimated probability distribution of fidelities.

In yet another embodiment of the system, the edge weights and the cluster-reward are readjusted with respect to the performance metric.

In yet another aspect, a non-transitory computer readable medium is provided. The non-transitory computer readable medium includes a plurality of instructions, which when executed, cause the one or more hardware processors to receive, via one or more hardware processors, an input data comprising a) definition of each of a plurality of tasks for experimentation, b) information on orchestration of each of the plurality of tasks as workflow defining execution order and concurrency of execution, and c) a search space for triggering the plurality of tasks. Further a training data is generated using the input data, via the one or more hardware processors. Generating the training data includes the following steps. A plurality of initial high-level combinations of the plurality of tasks are generated based on a plurality of hyper parameters with default parameters from the search space. Further, the plurality of high-level combinations are prioritized. Prioritizing the plurality of high-level combinations includes the following steps. Initially, a dissimilarity score between each two distinct experiments among a plurality of experiments associated with the plurality of tasks is computed. Further, a graph is generated, wherein in the graph, the plurality of experiments form vertices of the graph and an exponentiation of negative pairwise dissimilarity score form edge-weights of the vertices. Further, the vertices of the graph are soft-clustered into a plurality of clusters to determine probability of each node of the graph belonging to a cluster. Further, a plurality of subgraphs are generated for each cluster, wherein in the subgraph, the plurality of experiments form vertices of the graph and pairwise dissimilarity score form edge-weights of the vertices. Further, the following steps are iteratively performed till one of a) all the vertices have been evaluated, b) a maximum number of trials has been exhausted, and c) a defined time-limit has been reached is satisfied: selecting a cluster based on an associated probability score, wherein the probability score depends on a cluster-reward; computing a sum of edge weights with respect to a neighbor edge of each vertex within the selected cluster; computing a probability score for each vertex using softmax on the computed sum of edge weights, wherein the probability score determines probability of selecting the vertex for execution, wherein the plurality of high-level combinations are prioritized based on value of the associated probability score; selecting a vertex from the selected cluster, based on the computed probability score; and executing the selected vertex based on the probability score to obtain a performance metric, wherein the input data and the associated performance metric forms the training data. Further, a GNN data model is trained using the training data.

In yet another embodiment of the non-transitory computer readable medium, the information on orchestration of each of the plurality of tasks is received as workflow defining execution order and concurrency of execution.

In yet another embodiment of the non-transitory computer readable medium, the dissimilarity score between the two distinct experiments is computed using fidelity, hilbert space, and estimated probability distribution of fidelities.

In yet another embodiment of the non-transitory computer readable medium, the edge weights and the cluster-reward are readjusted with respect to the performance metric It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
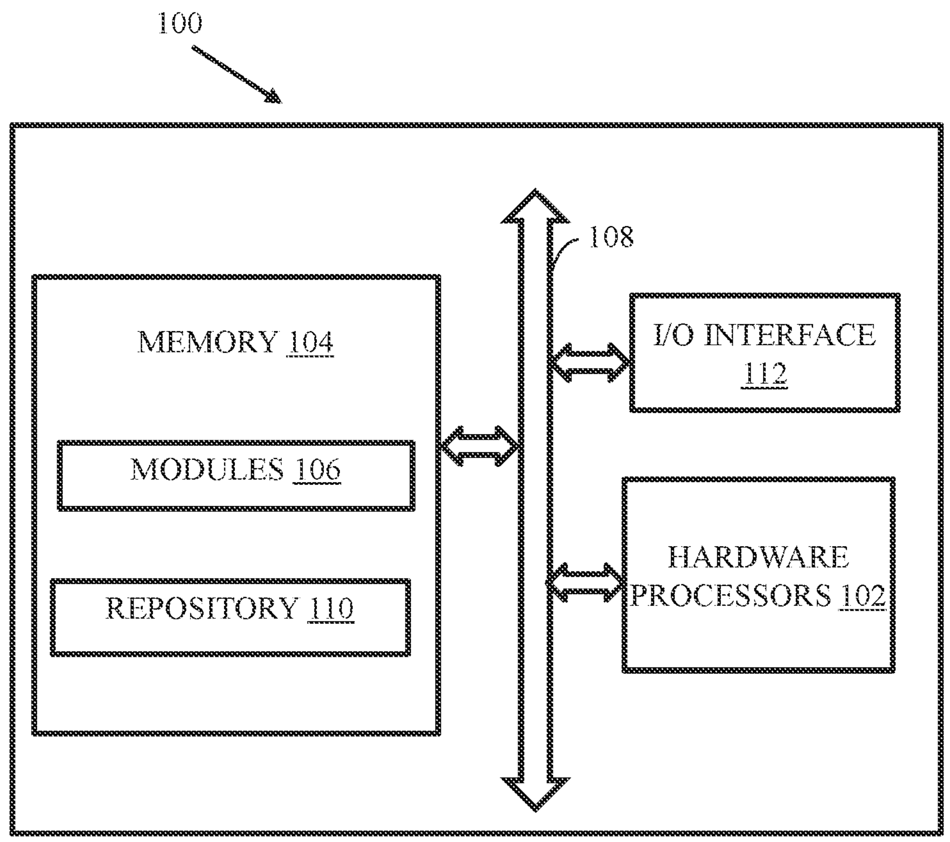
FIG. 1 illustrates an exemplary system for recommending optimum combination of quantum circuits, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Typically, experimentation based approaches are used for shortlisting the appropriate components in quantum circuits. However, the state of the art approaches being used for quantum experimentation have the following challenges: a) manual efforts are involved to perform large number of experiments, b) the approaches are cumbersome, effort intensive and iterative processes, c) they do not provide means for identifying all combinations for experimentation, d) for executed all or subset of experiments, tracking results and comparing them is difficult, and e) manual interventions are required, which makes the process time consuming and prone to errors.

In order to address these challenges, a method and system for recommending optimum combination of quantum circuits is provided. The method includes receiving, via one or more hardware processors, an input data comprising a) definition of each of a plurality of tasks for experimentation, b) information on orchestration of each of the plurality of tasks as workflow defining execution order and concurrency of execution, and c) a search space for triggering the plurality of tasks. Further a training data is generated using the input data, via the one or more hardware processors. Generating the training data includes the following steps. A plurality of initial high-level combinations of the plurality of tasks are generated based on a plurality of hyper parameters with default parameters from the search space. Further, the plurality of high-level combinations are prioritized, Prioritizing the plurality of high-level combinations includes the following steps. Initially, a dissimilarity score between each two distinct experiments among a plurality of experiments associated with the plurality of tasks is computed. Further, a graph is generated, wherein in the graph, the plurality of experiments form vertices of the graph and an exponentiation of negative pairwise dissimilarity score form edge-weights of the vertices. Further, the vertices of the graph are soft-clustered into a plurality of clusters to determine probability of each node of the graph belonging to a cluster. Further, a plurality of subgraphs are generated for each cluster, wherein in the subgraph s the plurality of experiments form vertices of the graph and pairwise dissimilarity score form edge-weights of the vertices. Further, the following steps are iteratively performed till one of a) all the vertices have been evaluated, b) a maximum number of trials has been exhausted, and c) a defined time-limit has been reached is satisfied: selecting a cluster based on an associated probability score, wherein the probability score depends on a cluster-reward; computing a sum of edge weights with respect to a neighbor edge of each vertex within the selected cluster; computing a probability score for each vertex using softmax on the computed sum of edge weights, wherein the probability score determines probability of selecting the vertex for execution, wherein the plurality of high-level combinations are prioritized based on value of the associated probability score; selecting a vertex from the selected cluster, based on the computed probability score; and executing the selected vertex based on the probability score to obtain a performance metric, wherein the input data and the associated performance metric forms the training data. Further, a GNN data model is trained using the training data.

Referring now to the drawings, and more particularly to FIG. 1 through FIG. 3B, where similar reference characters denote corresponding features consistently throughout the figures, there are shown preferred embodiments and these embodiments are described in the context of the following exemplary system and/or method, FIG. 1 illustrates an exemplary system for recommending optimum combination of quantum circuits, according to some embodiments of the present disclosure.

The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the Ike. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, Quantum Random Access Memory (QRAM), and magnetic tapes. In an embodiment, the memory 104 includes a plurality of modules 106.

The plurality of modules 106 include programs or coded instructions that supplement applications or functions performed by the system 100 for executing different steps involved in the process of recommending optimum combination of quantum circuits, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, Quantum Processing Units (QPUs), and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for recommending optimum combination of quantum circuits.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 and FIG. 3, FIG. 2 is a flow diagram depicting steps involved in the process of recommending optimum combination of quantum circuits, by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2 and FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 2:
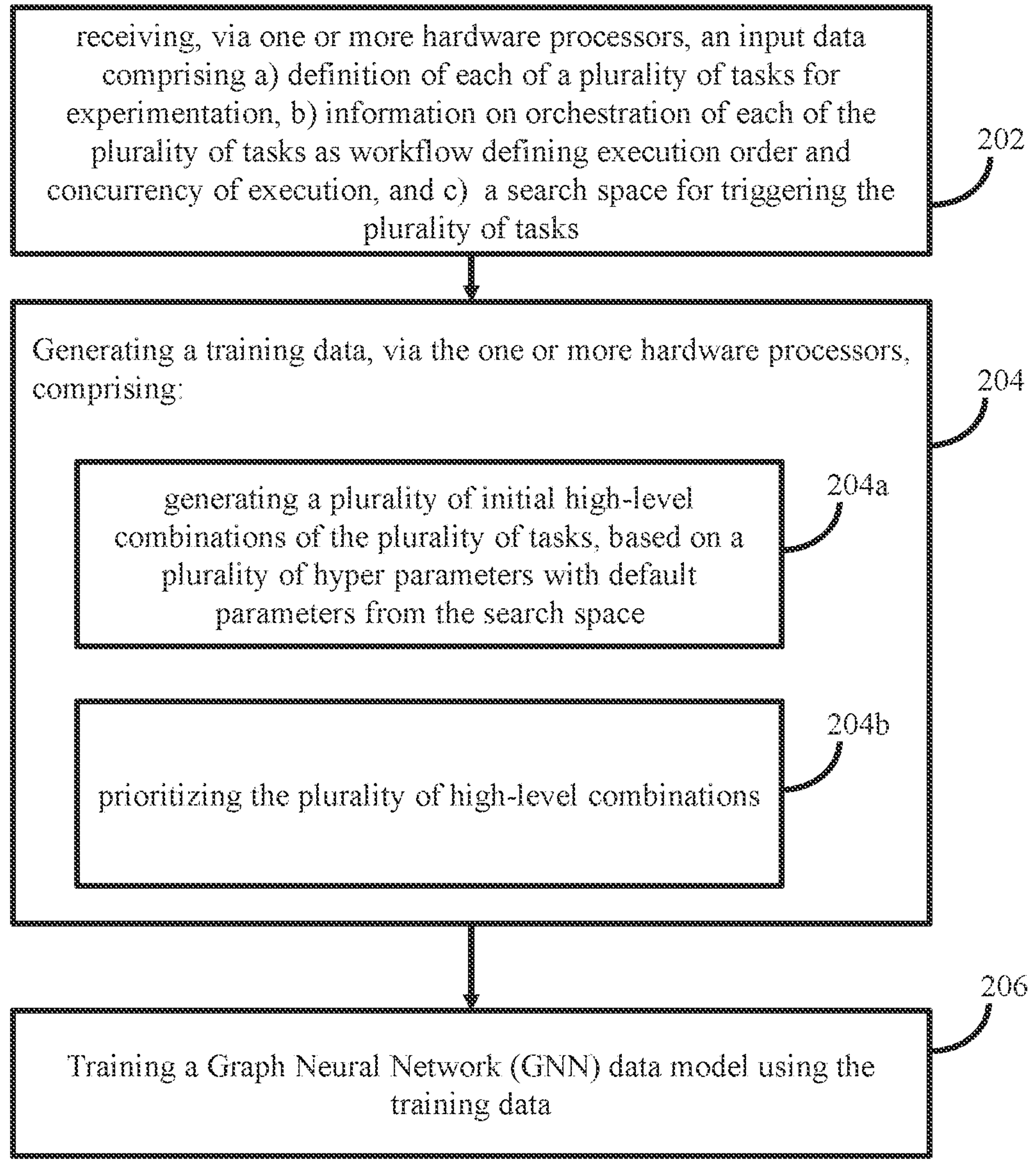
FIG. 2 is a flow diagram depicting steps involved in the process of recommending optimum combination of quantum circuits, by the system of FIG. 1, according to some embodiments of the present disclosure.
Figure 3A:
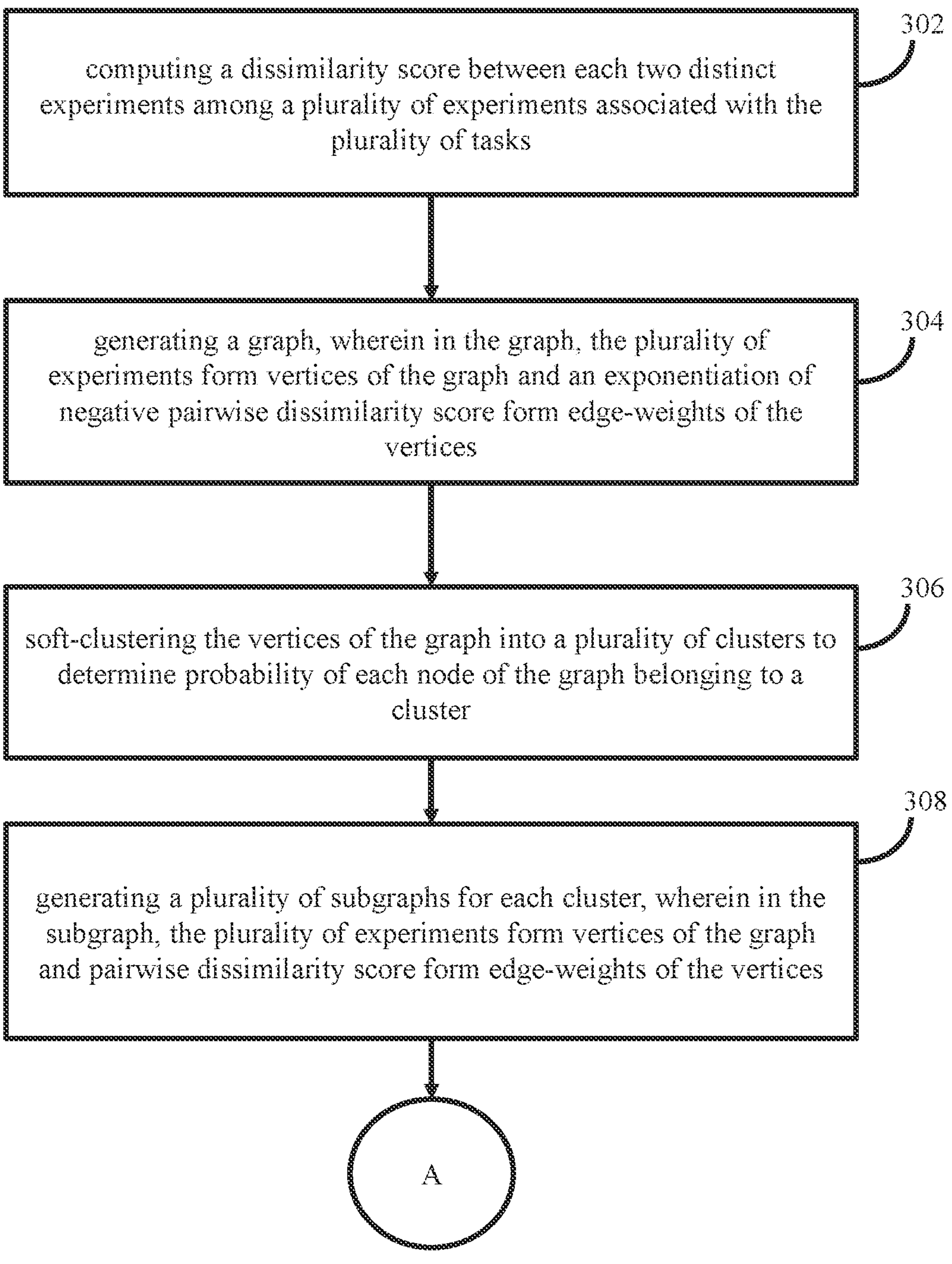
FIGS. 3A and 3B illustrate a flow diagram depicting steps involved in the process of prioritizing high-level combinations of tasks in the quantum circuits, using the system of FIG. 1, in accordance with some embodiments of the present disclosure.
Figure 3B:
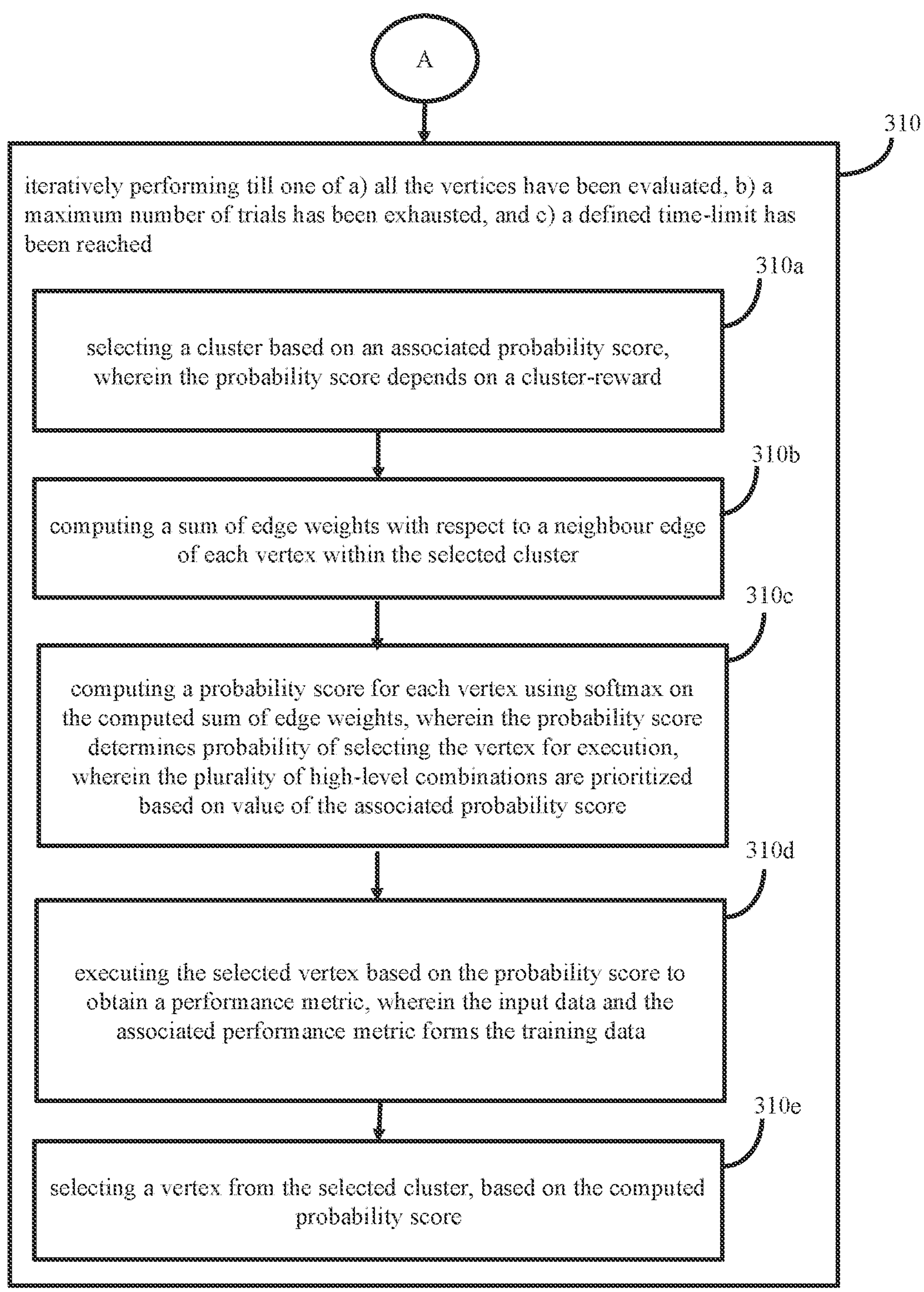

FIG. 2 is a flow diagram depicting steps involved in the process of recommending optimum combination of quantum circuits, by the system of FIG. 1, according to some embodiments of the present disclosure.

At step 202 of a method 200 in FIG. 2, the system 100 receives, via the one or more hardware processors 102, an input data comprising a) definition of each of a plurality of tasks for experimentation, b) information on orchestration of each of the plurality of tasks as workflow defining execution order and concurrency of execution, and c) a search space for triggering the plurality of tasks. In various embodiments, the input data maybe provided by a user via one or more suitable interfaces, and/or collected automatically by the system 100 from one or more associated data sources. For example, the system 100 may be configured to interact with one or more quantum circuits being monitored, to collect values on one or more associated parameters.

Further at step 204 of the method 200, the system 100 generates a training data using the input data, via the one or more hardware processors 102. Broad level steps involved in generating the training data are depicted in steps 204*a* and 204*b*. At the step 204*a*, the system 100 generates a plurality of initial high-level combinations of the plurality of tasks based on a plurality of hyper parameters with default parameters from the search space. In an embodiment, the system 100 may collect and use user inputs for generating the initial high-level combinations. The initial high-level combinations may include a plurality of associated tasks. Each of the plurality of associated tasks may be of different importance in terms of their relevance. For example, some tasks may have high relevance and may be classified as of high importance; while some other tasks may be of less relevance and maybe classified as having less importance. In an embodiment, the term 'relevance' in the context of the embodiments herein may be in terms of significance of results of the tasks for the quantum circuit. For example, result of a task classified as of high importance may have high significance. Likewise, execution of the less important tasks may not be always required, as the corresponding results may not have any significant effect on final output of the quantum circuit, and may be beneficial in a resource constraint scenario. To facilitate this, at step 204*b*, the system 100 prioritizes the plurality of high-level combinations. Various steps involved in the process of prioritizing the plurality of high-level combinations are depicted in method 300 in FIG. 3, and are explained hereafter.

At step 302 of the method 300, the system 100 computes a dissimilarity score between each two distinct experiments $E_1$ and $E_2$ among a plurality of experiments associated with the plurality of tasks. Quantum circuits associated with $E_1$ and $E_2$ are represented by unitary operators $U_1$ (θ) and $U_2$ (θ). In an embodiment, the dissimilarity score between the two distinct experiments is computed using fidelity, hilbert space, and estimated probability distribution of fidelities, and is represented as:

$$d_{ij} = \left(\hat{P}_{PQC}(F, \theta) \middle\| P_{H_{aar}}(F)\right), \tag{1}$$

where, $P_{H_{aar}}(F)=(N-1)(1-F)^{N-2}$, $F=|\langle \psi_\theta|\psi_\phi\rangle|^2$ is the fidelity, N is the dimension of the Hilbert space, and $\hat{P}_{PQC}(F, \theta)$ is estimated probability distribution of fidelities resulting from sampling states from a parameterized quantum circuit.

Figure 4:
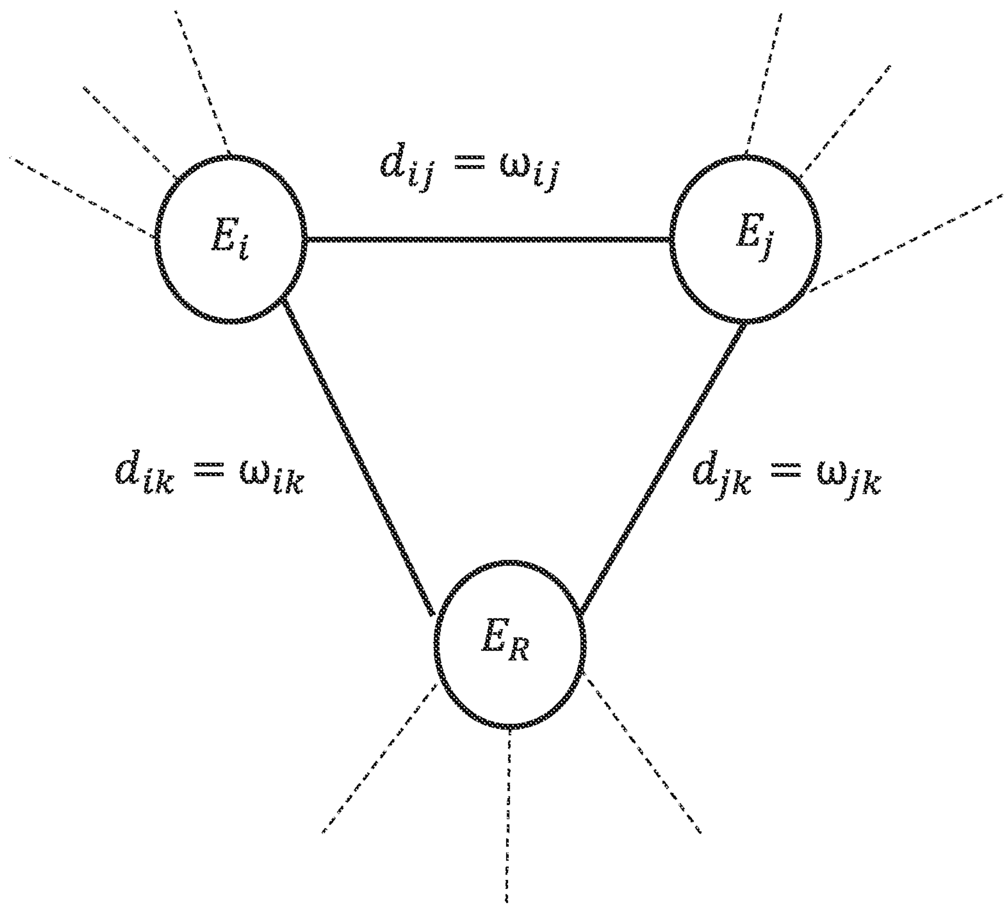
FIG. 4 is an example graph generated by the system of FIG. 1, in accordance with some embodiments of the present disclosure.

Further, at step 304 of the method 300, the system 100 generates a graph, wherein in the graph, the plurality of experiments form vertices of the graph and an exponentiation of negative pairwise dissimilarity score form edge-weights of the vertices. An example graph is depicted in FIG. 4. In an embodiment, in order to simplify calculations, edges with weight less than a certain threshold may be removed, leading to a sparser graph. A vertex is considered visited if the experiment corresponding to it has been evaluated, and unvisited otherwise. Also, all the nodes in the graph are unvisited at the beginning of the procedure. The system 100 may use any graph generation technique for generating the graph.

Further, at step 306 of the method 300, the vertices of the graph are soft-clustered into a plurality of clusters to determine probability of each node of the graph belonging to a cluster. The system 100 may use any suitable soft-clustering approach at this step. Some examples of the soft-clustering approaches that may be used are, but not limited to, multi-way K-cut, normalized cut, and ratio cut. The soft-clustering is done to get a plurality of responsibilities $\gamma_{ik}$ which denotes a probability that a vertex i belongs to a cluster k, where, $i \in \{1, \ldots, N\}$, and $k \in \{1, \ldots, K\}$.

Further, at step 308 of the method 300, a plurality of subgraphs are generated for each cluster, wherein in each of the subgraphs, the plurality of experiments form vertices of the graph and pairwise dissimilarity score form edge-weights of the vertices. Further, at step 310 of the method 300, the system 100 iteratively performs steps 310*a* through 310*e*, till one of a) all the vertices have been evaluated, b) a maximum number of trials has been exhausted, and c) a defined time-limit has been reached is satisfied. In various embodiments, values of the maximum number of trials and the time-limit are pre-configured or dynamically configured with the system 100, as per requirements.

At step 310*a*, the system 100 selects a cluster based on an associated probability score, wherein the probability score depends on a cluster-reward $$R_k^t,$$

as:

$$P_k = \frac{e^{-R_k}}{\sum_j e^{-R_j}} \tag{2}$$

The system 100 may select a cluster having a highest value of probability scores, by comparing the probability score of all the clusters.

Further, at step 310*b*, the system 100 computes a sum of edge weights with respect to a neighbor edge of each vertex within the selected cluster, as:

$$S_1 = \sum_j \omega_{ij}, \tag{3}$$

where, j is neighbor of vertex i.

Further, at step 310*c*, the system 100 computes a probability score for each vertex using softmax on the computed sum of edge weights, wherein the probability score determines probability of selecting the vertex for execution, wherein the plurality of high-level combinations are prioritized based on value of the associated probability score. The probability score of each vertex is computed as:

$$P_i = \frac{e^{-S_t}}{\sum_j e^{-S_j}} \tag{4}$$

Further, at step 310*d*, the system 100 selects a vertex from the selected cluster, based on the computed probability score. The system 100 may select a vertex having highest value of the probability score, from among the plurality of vertices. At this step, out of the unvisited nodes of the graph, the system 100 selects a node according to the distribution $P_i$ with probability ($1-\epsilon$), or a random unvisited vertex is picked with probability $\epsilon$ so as to encourage exploitation. Further, at step 310*e*, the system 100 executes the selected vertex to obtain a performance metric, wherein the input data and the associated performance metric forms the training data.

If an optimization (minimization) problem is considered, then the performance metric is obtained by running quantum optimization algorithms (such as Variational quantum eigensolver (VQE), Quantum approximate optimization algorithm (QAOA), etc.) using the hyperparameters of the vertex. In this case, the performance metric would be the objective function value at convergence. If the application is an ML application for example, then also quantum algorithms for a stated ML problem are executed with the hyperparameters of the selected vertex. The performance metric maybe accuracy, F1 score, Recall, and so on, Execution of the selected vertex includes performing/executing an experiment $E_i$ that is associated with a node i, which returns an accuracy of $a_i$.

In another embodiment, the edge weights and the cluster-reward are readjusted with respect to the performance metric, such that if the present experiment performed well, the probability of selecting neighboring vertices increases, and vice versa. The:

$$\omega_{ij} \leftarrow \omega_{ij}(1-\alpha_i) \tag{5}$$

$$R_k^{t+1} \leftarrow R_k^t + (\gamma_{ik} r_i^t - R_k^t)/(t+1) \tag{6}$$

This training data is used at step 206 of the method 200 to train the GNN data model. In various embodiments, the GNN maybe a Graph Neural Network or Graph Convolutional Neural Network, or any other graph based neural networks. By means of the training, the GNN learns correlation between values of different hyper parameters and corresponding results as indicated in the performance metric.

The GNN data model may be then used for processing data from quantum circuits to recommend optimal quantum circuits, such that a maximum performance can be obtained using the recommended optimal quantum circuits.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of selection of experiments in quantum circuits. The embodiment, thus provides a mechanism for generating a training data in which a plurality of high level combinations of experiments are prioritized using a graph based approach. Moreover, the embodiments herein further provide a method of training a Graph based Neural Network model using the training data, and then using the GNN for generating optimum combination of quantum circuits.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), QPUs, or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random-access memory (RAM), QRAM, read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, further comprising:

interacting, via one or more hardware processors, with one or more quantum circuits being monitored, to collect an input data comprising values on one or more associated parameters;

receiving, via the one or more hardware processors, the input data further comprising a) definition of each of a plurality of tasks for experimentation, b) information on orchestration of each of the plurality of tasks, and c) a search space for triggering the plurality of tasks;

generating a training data, via the one or more hardware processors, further comprising:

generating a plurality of initial high-level combinations of the plurality of tasks, based on a plurality of hyper parameters with default parameters from the search space; and prioritizing the plurality of high-level combinations, further comprising:

computing a dissimilarity score between each two distinct experiments among a plurality of experiments associated with the plurality of tasks, wherein the quantum circuits associated with the two distinct experiments $E_1$ and $E_2$ are represented by unitary operators $U_1(\theta)$ and $U_2(\theta)$ and the dissimilarity score between the two distinct experiments is computed using fidelity, hilbert space, and estimated probability distribution of fidelities, and is represented as:

$$d_{ij} = \left(\hat{P}_{PQC}(F, \theta) \| P_{H_{aar}}(F)\right),$$

where, $P_{H_{aar}}(F)=(N-1)(1-F)^{N-2}$, $F=|\langle \psi_\theta | \psi_\phi \rangle|^2$ is the fidelity, N is the dimension of the Hilbert space, and $\hat{P}_{PQC}(F, \theta)$ is the estimated probability distribution of fidelities resulting from sampling states from a parameterized quantum circuit;

generating a graph, wherein in the graph, the plurality of experiments form vertices of the graph and an exponentiation of negative pairwise dissimilarity score form edge-weights of the vertices;

soft-clustering the vertices of the graph into a plurality of clusters to determine probability of each node of the graph belonging to a cluster;

generating a plurality of subgraphs for each cluster, wherein in the subgraph, the plurality of experiments form vertices of the graph and pairwise dissimilarity score form edge-weights of the vertices; and iteratively performing till one of a) all the vertices have been evaluated, b) a maximum number of trials has been exhausted, and c) a defined time-limit has been reached:

selecting a cluster based on an associated probability score, wherein the probability score depends on a cluster-reward;

computing a sum of edge weights with respect to a neighbour edge of each vertex within the selected cluster;

computing a probability score for each vertex using softmax on the computed sum of edge weights, wherein the probability score determines probability of selecting the vertex for execution, wherein the plurality of high-level combinations are prioritized based on value of the associated probability score;

selecting a vertex from the selected cluster, based on the computed probability score; and executing the selected vertex based on the probability score to obtain a performance metric, wherein executing the selected vertex includes executing an experiment $E_i$ that is associated with a node i, which returns an accuracy of $a_i$, wherein the edge weights and the cluster-reward are readjusted with respect to the performance metric, wherein the input data and the associated performance metric forms the training data;

training a GNN data model using the training data, wherein the trained GNN data model learns correlation between values of the plurality of hyper parameters and corresponding results as indicated in the performance metric; and using the trained GNN data model for processing data from the quantum circuits to recommend optimal combination of the quantum circuits, wherein the recommendation is such that a maximum performance is obtained using the recommended optimal combination of the quantum circuits.

2. The method of claim 1, wherein the information on orchestration of each of the plurality of tasks is received as workflow defining execution order and concurrency of execution.

3. The method of claim 1, wherein edges with a weight less than a predefined threshold are removed, leading to a sparser graph and a vertex is considered visited if the experiment corresponding to it is evaluated, and unvisited otherwise.

4. A system, comprising:

one or more hardware processors;

a communication interface; and a memory storing a plurality of instructions, wherein the plurality of instructions when executed, cause the one or more hardware processors to:

interact with one or more quantum circuits being monitored, to collect an input data comprising values on one or more associated parameters;

receive the input data further comprising a) definition of each of a plurality of tasks for experimentation, b) information on orchestration of each of the plurality of tasks, and c) a search space for triggering the plurality of tasks;

generate a training data, by:

generating a plurality of initial high-level combinations of the plurality of tasks, based on a plurality of hyper parameters with default parameters from the search space; and prioritizing the plurality of high-level combinations, further comprising:

computing a dissimilarity score between each two distinct experiments among a plurality of experiments associated with the plurality of tasks, wherein the quantum circuits associated with the two distinct experiments $E_1$ and $E_2$ are represented by unitary operators $U_1$ $(\theta)$ and $U_2$ $(\theta)$ and the dissimilarity score between the two distinct experiments is computed using fidelity, hilbert space, and estimated probability distribution of fidelities, and is represented as:

$$d_{ij} = \left(\hat{P}_{PQC}(F, \theta) \middle\| P_{H_{aar}}(F)\right),$$

where, $P_{H_{aar}}(F)=(N-1)(1-F)^{N-2}$, $F=|\langle \psi_\theta|\psi_\phi\rangle|^2$ is the fidelity, N is the dimension of the Hilbert space, and $\hat{P}_{PQC}(F, \theta)$ is the estimated probability distribution of fidelities resulting from sampling states from a parameterized quantum circuit;

generating a graph, wherein in the graph, the plurality of experiments form vertices of the graph and an exponentiation of negative pairwise dissimilarity score form edge-weights of the vertices;

soft-clustering the vertices of the graph into a plurality of clusters to determine probability of each node of the graph belonging to a cluster;

generating a plurality of subgraphs for each cluster, wherein in the subgraph, the plurality of experiments form vertices of the graph and pairwise dissimilarity score form edge-weights of the vertices; and iteratively performing till one of a) all the vertices have been evaluated, b) a maximum number of trials has been exhausted, and c) a defined time-limit has been reached:

selecting a cluster based on an associated probability score, wherein the probability score depends on a cluster-reward;

computing a sum of edge weights with respect to a neighbour edge of each vertex within the selected cluster;

computing a probability score for each vertex using softmax on the computed sum of edge weights, wherein the probability score determines probability of selecting the vertex for execution, wherein the plurality of high-level combinations are prioritized based on value of the associated probability score;

selecting a vertex from the selected cluster, based on the computed probability score; and executing the selected vertex based on the probability score to obtain a performance metric, wherein executing the selected vertex includes executing an experiment $E_i$ that is associated with a node i, which returns an accuracy of $a_i$, wherein the edge weights and the cluster-reward are readjusted with respect to the performance metric, wherein the input data and the associated performance metric forms the training data;

train a GNN data model using the training data, wherein the trained GNN data model learns correlation between values of the plurality of hyper parameters and corresponding results as indicated in the performance metric; and use the trained GNN data model for processing data from the quantum circuits to recommend optimal combination of the quantum circuits, wherein the recommendation is such that a maximum performance is obtained using the recommended optimal combination of the quantum circuits.

5. The system of claim 4, wherein the one or more hardware processors are configured to receive the information on orchestration of each of the plurality of tasks as workflow defining execution order and concurrency of execution.

6. One or more non-transitory machine-readable information storage mediums comprising one or more instructions which when executed by one or more hardware processors cause:

interacting with one or more quantum circuits being monitored, to collect an input data comprising values on one or more associated parameters;

receiving the input data further comprising a) definition of each of a plurality of tasks for experimentation, b) information on orchestration of each of the plurality of tasks, and c) a search space for triggering the plurality of tasks;

generating a training data, further comprising:

generating a plurality of initial high-level combinations of the plurality of tasks, based on a plurality of hyper parameters with default parameters from the search space; and prioritizing the plurality of high-level combinations, further comprising:

computing a dissimilarity score between each two distinct experiments among a plurality of experiments associated with the plurality of tasks, wherein the quantum circuits associated with the two distinct experiments $E_1$ and $E_2$ are represented by unitary operators $U_1(\theta)$ and $U_2(\theta)$ and the dissimilarity score between the two distinct experiments is computed using fidelity, hilbert space, and estimated probability distribution of fidelities, and is represented as:

$$d_{ij} = \left(\hat{P}_{PQC}(F, \theta) \| P_{H_{aar}}(F)\right),$$

where, $P_{H_{aar}}(F)=(N-1)(1-F)^{N-2}$, $F=|\langle \psi_\theta | \psi_\phi \rangle|^2$ is the fidelity, N is the dimension of the Hilbert space, and $\hat{P}_{PQC}(F, \theta)$ is the estimated probability distribution of fidelities resulting from sampling states from a parameterized quantum circuit;

generating a graph, wherein in the graph, the plurality of experiments form vertices of the graph and an exponentiation of negative pairwise dissimilarity score form edge-weights of the vertices;

soft-clustering the vertices of the graph into a plurality of clusters to determine probability of each node of the graph belonging to a cluster;

generating a plurality of subgraphs for each cluster, wherein in the subgraph, the plurality of experiments form vertices of the graph and pairwise dissimilarity score form edge-weights of the vertices; and iteratively performing till one of a) all the vertices have been evaluated, b) a maximum number of trials has been exhausted, and c) a defined time-limit has been reached:

selecting a cluster based on an associated probability score, wherein the probability score depends on a cluster-reward;

computing a sum of edge weights with respect to a neighbour edge of each vertex within the selected cluster;

computing a probability score for each vertex using softmax on the computed sum of edge weights, wherein the probability score determines probability of selecting the vertex for execution, wherein the plurality of high-level combinations are prioritized based on value of the associated probability score;

selecting a vertex from the selected cluster, based on the computed probability score; and executing the selected vertex based on the probability score to obtain a performance metric, wherein executing the selected vertex includes executing an experiment $E_i$ that is associated with a node i, which returns an accuracy of $a_i$, wherein the edge weights and the cluster-reward are readjusted with respect to the performance metric, wherein the input data and the associated performance metric forms the training data;

training a GNN data model using the training data, wherein the trained GNN data model learns correlation between values of the plurality of hyper parameters and corresponding results as indicated in the performance metric; and using the trained GNN data model for processing data from the quantum circuits to recommend optimal combination of the quantum circuits, wherein the recommendation is such that a maximum performance is obtained using the recommended optimal combination of the quantum circuits.

7. The one or more non-transitory machine-readable information storage mediums of claim 6, wherein the information on orchestration of each of the plurality of tasks is received as workflow defining execution order and concurrency of execution.

* * * * *